United States Patent [19]

Schiek

[11] Patent Number: 4,731,007
[45] Date of Patent: Mar. 15, 1988

[54] DOUGH FEEDING ASSEMBLY
[75] Inventor: Robert J. Schiek, Miami, Fla.
[73] Assignee: Royal Bakery Equipment, Inc., Miami, Fla.
[21] Appl. No.: 68,476
[22] Filed: Jul. 1, 1987
[51] Int. Cl.$^4$ ............................................... A21C 5/04
[52] U.S. Cl. .................... 425/238; 425/405 R; 425/812; 425/DIG. 60; 425/405.1; 426/503
[58] Field of Search ............... 426/503; 425/238, 239, 425/240, 241, 405 R, 504, 812

[56]  References Cited
U.S. PATENT DOCUMENTS

| | | | |
|---|---|---|---|
| 1,954,501 | 4/1934 | Steere | 425/241 |
| 2,162,641 | 6/1939 | Rhodes | 425/241 |
| 2,754,774 | 7/1956 | Vogt | 425/241 |
| 2,787,972 | 4/1957 | Vogt | 425/241 |
| 2,858,775 | 11/1958 | Marasso | 425/241 |
| 4,391,576 | 7/1983 | Cummins | 425/241 |
| 4,503,995 | 3/1985 | Anderson | 425/241 |

Primary Examiner—William Hoag
Attorney, Agent, or Firm—John Cyril Malloy

[57] ABSTRACT

A dough delivery or divider assembly having a plurality of ports integrally formed in a cylindrical dispensing structure and incorporating an external pressurizing structure wherein a negative pressure or vacuum is applied to the interior of each of the ports from an exterior location relative to the cylindrical surface in which the ports are formed. The vacuum is maintained within the ports until they are exposed to the supply dough within a supply hopper wherein the negative pressure aids forcing of the dough into the ports for transportation to a delivery site at which location the dough portions are removed from the ports.

12 Claims, 5 Drawing Figures

DOUGH FEEDING ASSEMBLY

BACKGROUND OF THE INVENTION

1. Field of the Invention

This invention relates to a dough divider or delivery assembly of the type specifically designed to remove individual dough portions in predetermined quantities from a common supply of dough and the delivery of such dough portions to a delivery site such as a conveyor belt wherein further processing is accomplished.

2. Description of the Prior Art

Conventionally, dough is divided into equal volumetric portions from a main or common supply of dough wherein such portions are rolled into balls and deposited into pans for further baking, processing, etc. The prior art is replete with rotary dough dividers used to accomplish this purpose as evidenced by the following U.S. Pat. Nos. to Steere, 1,954,501; Marasso, 2,858,775; Atkins, 3,541,974; and Cummuns, 4,391,576.

Typical of prior art structures is the assembly disclosed in the above noted patent to Cummons which is directed to a rotary drum dough divider. More specifically, Cummuns discloses an improved assembly for use in a cylinder of a rotating drum type dough divider comprising a sleeve positioned in the cylinder forming seals on both sides of a pair of diametrically opposed guide slots connected to atmosphere and a pair of ducts communicating with the cylinder at opposite ends of the sleeve which are alternately connected to pressure and vacuum. A double acting piston having a head at each end of the cylinder and a piston rod portion extending from each head into the sleeve, and a scaling rod joining the adjacent ends of the piston rod pushes together as provided. Such piston portions reciprocate to cause the rod portions and their heads to reciprocate together in the cylinder instead of by serving as a double ended cylinder and alternately open and closing opposite open ends of the cylinder for the receiving and dispensing of dough therein.

Typical to the problems associated with the prior art and recognized in the industry is the provision of a negative pressure or vacuum to the open end of the cylinder from a locale which is internal of the rotary drum. While the vacuum pump itself may physically by located externally of the rotating drum, connection of the negative fluid pressure source into the interior of the drum such that such negative pressure is drawn through the piston ends. Accordingly, when the open end or ports in the rotating drum is exposed to the supply of dough within a retaining hopper the dough portions in proper volumetric sizing are "sucked" into the exposed port and carried therewith to a delivery site. One problem commonly recognized with these prior art devices is the clogging or scaling of dough beyond the piston head due to the existence of negative pressure on the interior of the cylinder, internally of the location of the piston head. More specifically, after prolonged and continuous operation the dough being brought into the ports through the open ends thereof "leaks" into passages serving to connect the internal negative pressure source to the outer side of the piston. This in turn requires an at least partial dismantling of the assembly and a downtime of the machine in order that such inwardly scaled or leaked dough is removed therefrom. Failure to conduct such maintenance results in a loss of vacuum or negative pressure and failure of the volumetric portions to be brought into the open ended ports or pockets in the proper quantities. Inconsistency in the end product is the obvious result.

Accordingly, there is a need in this industry to provide a means of applying a negative pressure or vacuum to the ports immediately prior to their exposure to the common supply of dough in a manner which will eliminate the clogging of the dough or passage thereof beyond the piston heads into the integral or interior parts of the cylinder so that maintenance and downtime is eliminated or significantly reduced due to this problem.

SUMMARY OF THE INVENTION

The present invention relates to a delivery system specifically designed to remove pre-measured portions of dough from a common or central supply of dough, maintained in a retaining hopper and deliver such dough portions to a conveyor belt for carrying to further processing step. An important feature of the present invention is the provision of a pressurizing means used in combination with the dispensing means. The dispensing means, set forth above is preferably in the form of a cylinder structure having an external cylindrical surface configuration defining an outer operative surface in which a plurality of ports are formed to extend radially inward toward the center of the cylinder. Piston heads are reciprocally mounted within the ports and positionable between an open and closed position. The open position of each piston and its associated cylinder is defined by a recessed disposition of the cylinder head relative to the open end of the port contiguous to the outer operative surface of this cylinder. In such position a pocket is formed of known dimension wherein such pocket is exposed to the supply of dough for receipt of the aforementioned predetermined portion of dough therein. Continuous rotation of the cylinder thereby successively delivers the plurality of pockets from the supply of dough, at which location a portion of dough is received, to a delivery site. The delivery site is defined by a conveyor belt wherein the dough portions are carried thereby to different processing locations.

To facilitate the above process, the subject invention incorporates pressurizing means, as set forth above, used in combination with and in direct exposed cooperation to the outer surface of the dispensing cylinder. This pressurizing means comprises a "cap" or hood structure having an open face and a seal means mounted thereon. The open face is disposed to have a configuration substantially corresponding to the exterior configuration of the outer surface of the cylinder so as to be disposed in cooperative and specifically, fluid communication therewith. The seal means is disposed on the open face of the cap structure in engagement with the outer surface of the cylinder as it rotates. The seal means may be formed from a material commercially available under the trademark Dura-Seal which allows for the continuous rotation or sliding movement of the outer surface on the seal means while maintaining a fluid tight seal therebetween.

The pressurizing means further comprises a vacuum pump, which may be a substantially conventional design but which is interconnected to the cap structure in direct fluid communication with the open face thereof. A negative pressure is applied directly to the portion of the outer surface of the cylinder covered by the cap structure and effectively surrounded by the seal means on the open face of the cap structure. Naturally, due to the maintenance of the negative pressure over the outer surface of the cylinder such negative pressure will also be exposed to the ports when the piston head moves to the aforementioned open position. Therefore, the interior of the ports or pockets will be maintained under a negative pressure as these ports or pockets pass successively and continuously into direct exposure with the dough supply maintained within a supply hopper. The existence of the vacuum or negative pressure within the ports causes the dough to be "sucked" into the individual ports or pockets therefore serving to automatically measure out the portions of dough for delivery and dispensing at the delivery site or conveyor belt. The continued rotation of the cylinder thereby successively passes the ports, after being filled, from the supply of dough and the supply hopper to the delivery site. At this locale the piston heads within the respective cylinder, due to the existence and incorporation of mechanical linkage, known to the prior art, serves to move the piston head to the closed position thereby forcing the individual dough portions from their respective cylinder and allowing them to be dispensed at the delivery site.

Accordingly, an important feature of the present invention is a specific application of a negative pressure or vacuum to the operative outer surface of the cylinder and specifically to the ports to induce a negative pressure therein from an exterior location in order to prevent any clogging or scaling of the dough into the interior of the cylinders beyond the piston heads as is common in prior art machinery and procedures.

The invention accordingly comprises the features of construction, a combination of elements, and an arrangement of parts which will exemplified in the construction hereinafter set forth, the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
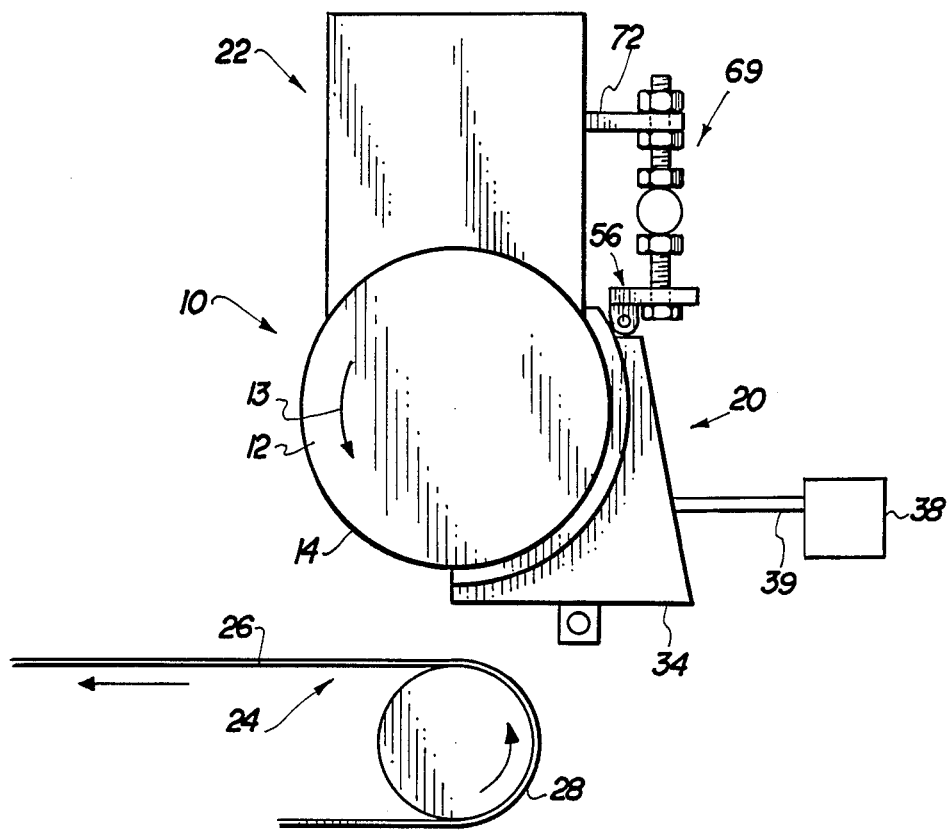
FIG. 1 is a schematic representation of the assembly of the present invention used in cooperation with a delivery site preferably in the form a conveyor belt to convey or carry formed dough portions to other processing steps not specifically associated with the present invention.
Figure 3:
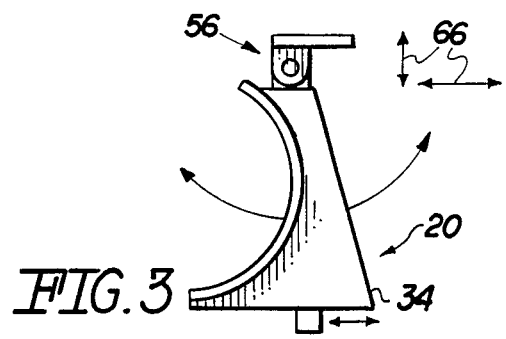
FIG. 3 is a schematic representation showing relative movement of the pressurizing structure of FIG. 2 relative to its operative position.

As shown in FIG. 1 the assembly of the present invention is generally indicated as 10 and comprises a dispensing means in the form of a dispensing cylinder 12 mounted to rotate in accordance with the directional arrow 13 in a continuous fashion during operation of the assembly 10. The cylinder 12 includes an outer cylindrical operative surface 14 having a plurality of ports formed therein and extending radially inward from the outer surface 14 inwardly toward the center of the cylinder. With reference to FIGS. 1 and 3 each of the ports 16 and accordingly their opened ends 18, due to the rotation of the cylinder 12 successively passes into exposure and registry with a pressurizing means generally indicated as 20 to be described in greater detail hereinafter and a supply of dough maintained within the supply hopper or retainer generally indicated as 22. Next, and again due to the rotation of the cylinder 12 the outer surface 14 and the ports 16 are passed from the supply hopper 22 to a delivery site generally indicated as 24 and schematically represented in FIG. 1 as a conveyor assembly in the form of a conveyor belt 26 driven by one or more drive rollers 28. The conveyor belt 26 delivers the preformed volumetric portions of dough to additional processing steps not specifically associated with the present invention.

Figure 4:
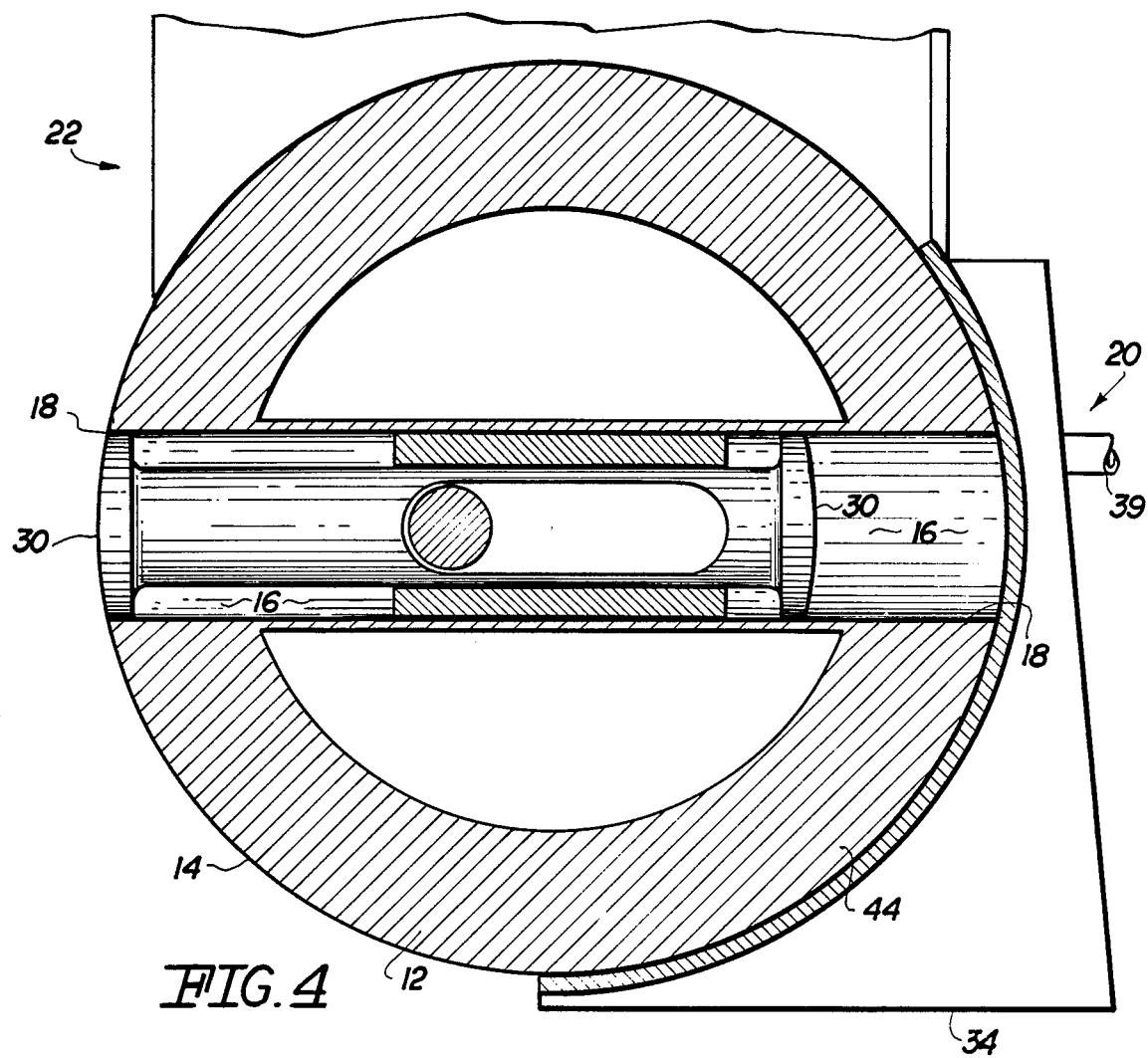
FIG. 4 is a sectional view in partial cut-away showing internal details of the dispensing cylinder and piston heads associated with opposed ports.
Figure 5:
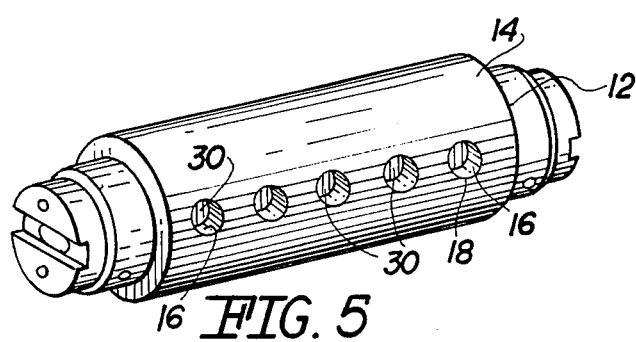
FIG. 5 is a prospective view showing details of the dispensing cylinder, ports formed therein and piston heads associated with the various ports.

From a review of FIGS. 4 and 5 it is noted that each of the ports 16 have reciprocally mounted therein a piston head 30 such that the piston head moves in between an open and closed position relative specifically to the opened end 18 of each of the ports. The reciprocal movement of the piston head 30 within its respective port is accomplished by mechanical linkage which may be of conventional design and manufacture and depended upon the rotation of the dispensing cylinder 12 (see FIG. 4). The piston head moves between its open and closed position based on its disposition relative to the dispensing means 20, the supply hopper 22 (and exposure to dough therein) and the delivery site 24. Further, the aforementioned open position of the piston head within its respective cylinder may be defined by an inward recessed disposition of the piston head 30 away from the open end thereby forming a pocket in each of the ports 16 for the reception of a portion of dough therein from the supply maintained within the supply hopper 22. The closed position of the piston head (see FIG. 4), as set forth above, is defined by the outer positioning or extension of the piston head into substantially flush or contiguous relation to the outer surface 14 of the dispensing cylinder 12 such that any dough portion contained within the pocket of the respective ports is dispensed therefrom as the piston head moves to its closed position as set forth above. Therefore, dispensing of any dough from the pocket within the respective ports is accomplished by the automatic positioning of the piston head from its open position to its closed position. This forces the dough portion onto the conveyor belt which, in the preferred embodiment described, defines a portion of the delivery site 24.

Figure 2:
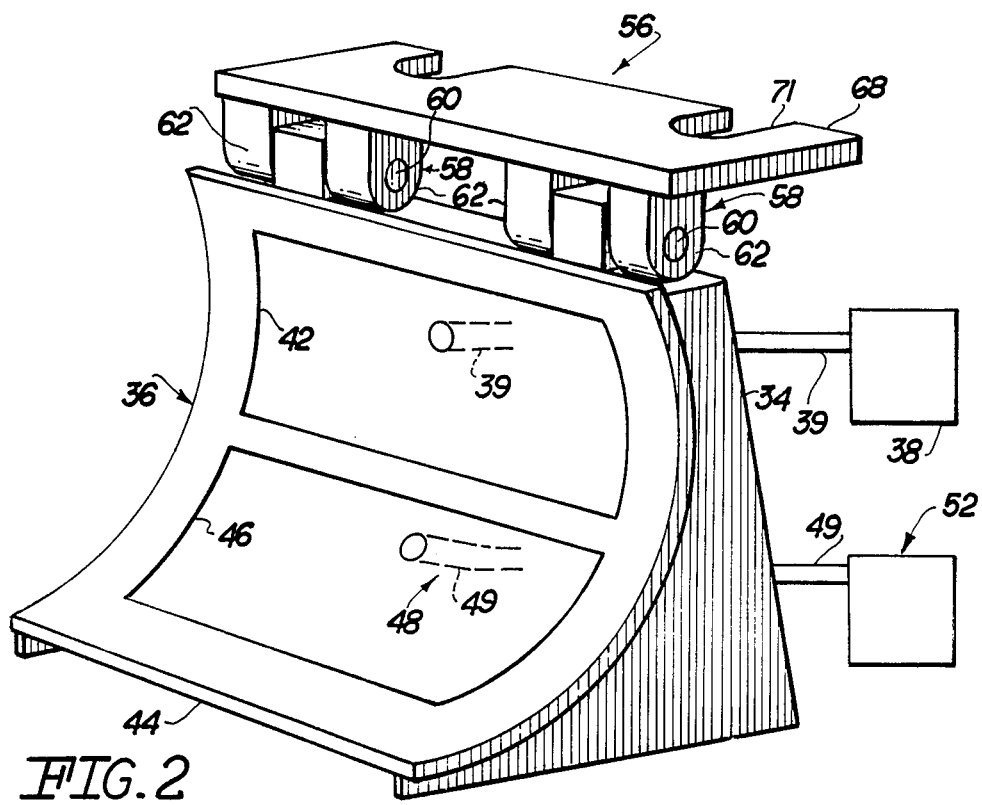
FIG. 2 is a detailed respective view of a pressurizing assembly associated with the structure of the present invention and having a mountin gbracket or like structure used therewith.

With reference to FIGS. 1, 2 and 3 the pressurizing means 20 comprises a cap structure 34 having an opened face (see FIG. 2) generally indicated as 36 which preferably has a concave configuration corresponding to the configuration of the outer cylindrical surface 14 of the dispensing cylinder 12.

With reference to FIGS. 1 and 2 it should be noted that the pressurizing means 20 further comprises a vacuum pump 38 which may be of conventional design and connected by an appropriate conduit as at 39 to the cap structure 34 and more specifically to direct exposure and fluid communication with the open face 36 as by opening 42.

In addition, the open face 36 includes a seal means preferably in the form of an at least partially peripherally located sealed gasket 44 extending about the periphery of the open face 36 and specifically about the opening 42 thereof. The seal means in the form of gasket 44 may be formed from the material commercially available under the trademark "Dura-Seal" and is specifically structured and disposed to engage the rotating outer surface 14 of the dispensing cylinder 12.

Another embodiment of the present invention also incorporated in the structure of FIG. 2 includes lubricating means in the form of a lubricating head or opening 46 including a lubricant disbursing structure generally indicated as 48 communicating, through proper conduit 49, to a supply of lubricant schematically represented as 52. The lubricant of course is in the form of an acceptable oil to come in direct contact with the dough product maintained within the hopper 22 so as not to contaminate the dough while at the same time reducing friction between the outer surface 14 of the dispensing cylinder 12 and any portions such as the open face 36 and seal gasket 44 of the pressurizing means 28 as well as the dough or any cooperating structure associated with the supply hopper 22.

Yet another embodiment of the present invention is also shown in FIGS. 2 and 3 and comprises a mounting assembly 56 secured to preferably an upper end of the cap structure 34 and including at least one or more hinge structures 58 disposed in spaced apart relation to one another. Each of the hinge structures 58 include a pivot pin 60 extending between upstanding ears 62 formed on the cap structure 34 and affixed thereto. Similar depending ears 64 are disposed to extend down between the ears 62 and also allow for the passage of the pivot pin 60 therethrough. By virtue of this interconnection it is readily seen that the cap structure 34 is pivotal relative to the mounting bracket 56 as schematically represented by directional the arrows in FIG. 3. Therefore, while a fluid type or sealed engagement occurs between the sealed means or the gasket 44 in the outer surface 14 of the dispensing cylinder 12 such engagement may in fact be "floating" or clearly adjustable to provide for any inconsistencies in the cylindrical outer surface 14 or adjustment or displacement in the disposition of the cylinder head 12. Also as further represented by directional arrow 66 the bracket 56 may be adjusted by mechanical linkage generally indicated as 69 in FIG. 1. The mechanical linkage serves to interconnect the mounting bracket 56 and the supported vacuum cap 34 in its operative fashion and may be adjusted based upon the changing of the dispensing cylinders 12 inside or placement. A support bracket 72 serves to connect and support the mechanical linkage 69 is also clearly shown in FIG. 1.

Therefore in operation the dispensing cylinder 12 serves to continuously rotate and by virtue of this rotation passes the outer cylindrical surface 14 as well as the ports therein successively into registry and cooperation with the pressurizing means 20, the dough within the supply hopper 22, and the delivery site 24. The rotation of the cylinder 12 is associated with the mechanical linkage of FIG. 4 to dispose, automatically, the piston heads 30 between the aforementioned and defined closed and open positions. Such linkage is arranged such that when the ports are in underlying, covered relation by the vacuum cap structure 34, the piston heads are in the open position relative to the open end 18 of the port 16 in order that the negative pressure, applied to the outer surface 14 as well as the port 16, will cause a vacuum within the ports. While this vacuum is maintained and the piston heads remain in their open position, the rotation of the cylinder 12 will position the open, negative pressurized ports 16 into receiving relation with the dough supply within the supply hopper 22 such that individual dough portions may be "sucked" into the individual pockets of the ports as discussed above. As the cylinder continues to rotate and the filled ports pass from the dispensing hopper 22 the pistons may be gradually and automatically disposed into their closed position thereby forcing the dough portions out from their respective pockets or ports onto the conveyor belt 26 representing and defining the delivery site 24.

Now that the invention has been described, what is claimed is:

1. A dough feeding assembly designed to remove individual dough portions from a supply hopper and disposed such portions to a delivery site, said assembly comprising:
   a. a dispensing means for collecting and dispensing the dough portions comprising a cylindrical outer surface,
   b. a plurality of ports formed in said dispensing means and each extending from said outer surface inwardly into said dispensing mean so as to form a dough holding pocket,
   c. said dispensing means rotatably mounted and disposed to define a path of travel of said plurality of ports at least from the supply hopper to the delivery site upon rotation of said dispensing means.
   d. each of said plurality of ports including a piston head reciprocally movable within a cooperating pocket of said respective cylinder and said piston head positionable between an open position and a closed position respectively defined by an inwardly recessed orientation and a substantially flush orientation relative to said open end of said respective port,
   e. pressurizing means for applying a negative pressure to said plurality of ports and mounted exteriorly or adjacent to said dispensing means and in at least partially sealing engagement to said outer surface thereof,
   f. said pressurizing means comprising a cap structure disposed exteriorly of the dispensing means and in at least partially sealing engagement with said outer surface and a vacuum pump means connected to said cap structure for supplying a negative pressure to said plurality of ports when said piston head is in said open position and when said outer surface is disposed in underlying and movably sealing engagement with said cap structure, and
   g. said plurality of ports transferable from aligned registry with said cap structure to receiving engagement with dough within the supply hopper when said piston heads are in said open position and said plurality of ports are under a negative pressure upon rotation of said dispensing means.

2. An assembly as in claim 1 wherein said dispensing means comprises a cylinder rotatable continuously and successively between said cap structure, the supply hopper and the delivery site.

3. An assembly as in claim 2 wherein each of said piston heads are in said open position when aligned with said cap structure and the supply hopper to successively receive negative pressure from the cap structure and dough from the supply hopper within the pockets of said plurality of ports.

4. An assembly as in claim 3 wherein each of said piston heads are disposable in a closed position when in registry with the delivery site, whereby dough portions are removed from said pockets of said plurality of ports and delivered to the delivery site.

5. An assembly as in claim 2 wherein said cap structure comprises an at least partially open face disposed in overlying engagement and fluid communication with said outer surface of said cylinder and said plurality of ports therein.

6. An assembly as in claim 5 wherein said open face is interconnected in fluid communication to said vacuum pump means and is configured to correspond to said outer surface of said cylinder and apply negative pressure thereto.

7. An assembly as in claim 6 wherein said cap structure comprises seal means secured to said open face and disposed in movably sliding engagement with said outer surface, said seal means structured and disposed for maintenance of negative pressure within said port when underlying said cap structure.

8. An assembly as in claim 1 wherein said cap structure is movably mounted into adjacent sealing engagement with said outer surface, said outer surface rotatable relative to said cap structure.

9. An assembly as in claim 8 wherein said cap structure comprises an at least partially open face disposed in overlying engagement and fluid communication with said outer surface of said dispensing means and said plurality of ports therein, said cap structure pivotly mounted relative to said dispensing means and said open face adjustably engaging said outer surface and maintaining sealing engagement therewith during rotation of said dispensing means relative to said cap structure.

10. An assembly as in claim 9 further comprising seal means secured to said open face substantially continuously but a periphery thereof in surrounding relation to an opening therein.

11. An assembly as in claim 1 wherein said cap structure further includes lubricating means mounted thereon for dispensing lubricant on said outer surface.

12. An assembly as in claim 11 wherein said lubricating means comprises a dispensing structure secured to said cap structure and disposed to deliver lubricant to said outer surface through said open face.

* * * * *